US010301178B2

(12) United States Patent
Davidson

(10) Patent No.: US 10,301,178 B2
(45) Date of Patent: May 28, 2019

(54) GENERATING ENERGY FROM WATER TO HYDROGEN SYSTEM

(71) Applicant: H2 Energy Now, Be'er Sheva (IL)

(72) Inventor: Sonya Davidson, Be'er Sheva (IL)

(73) Assignee: H2 Energy Now, Be'er Sheva (IL)

( * ) Notice: Subject to any disclaimer, the term of this patent is extended or adjusted under 35 U.S.C. 154(b) by 225 days.

(21) Appl. No.: 14/436,913

(22) PCT Filed: Oct. 23, 2013

(86) PCT No.: PCT/IL2013/050858
§ 371 (c)(1),
(2) Date: Apr. 20, 2015

(87) PCT Pub. No.: WO2014/064692
PCT Pub. Date: May 1, 2014

(65) Prior Publication Data
US 2015/0274521 A1    Oct. 1, 2015

Related U.S. Application Data

(60) Provisional application No. 61/717,645, filed on Oct. 24, 2012.

(51) Int. Cl.
*C01B 3/04* (2006.01)
*B01J 19/12* (2006.01)
(Continued)

(52) U.S. Cl.
CPC ............. *C01B 3/042* (2013.01); *B01J 19/129* (2013.01); *C01B 13/0207* (2013.01);
(Continued)

(58) Field of Classification Search
CPC .... C01B 3/042; C01B 13/0207; B01J 19/129; B01J 2219/0801; B01J 2219/1203;
(Continued)

(56) References Cited

U.S. PATENT DOCUMENTS 3,480,529 A * 11/1969 Waltrip ................. B01D 43/00
                                                 204/157.4
7,378,063 B1 * 5/2008 Wyles ....................... B01J 7/02
                                                    422/186
(Continued)

FOREIGN PATENT DOCUMENTS

CN       101546842 A     9/2009
CN       202906489 U     4/2013
(Continued)

OTHER PUBLICATIONS

R. Roy et al., "Observations of polarised RF radiation catalysis of dissociation of H 2 O—NaCl solutions", Materials Research Innovations, vol. 12, No. 1, Mar. 1, 2008 (Mar. 1, 2008), pp. 3-6, XP055279516, DE ISSN: 1432-8917, DOI: 10.1179/143307508/270875.

*Primary Examiner* — Nicholas A Smith
*Assistant Examiner* — Colleen M Raphael
(74) *Attorney, Agent, or Firm* — Daniel Feigelson; Fourth Dimension IP

(57) ABSTRACT

A system for generating hydrogen by dissociation of water, characterized by a hydrogen generation chamber for generating hydrogen from water containing electrolytes; a source of radiofrequency electromagnetic energy for providing energy to drive the dissociation of the water; and a control unit for controlling the energy source and liquid and gas flow.

19 Claims, 6 Drawing Sheets

(51) Int. Cl.
*C01B 13/02* (2006.01)
*H01M 8/18* (2006.01)

(52) U.S. Cl.
CPC ...... *H01M 8/186* (2013.01); *B01J 2219/0801* (2013.01); *B01J 2219/0871* (2013.01); *B01J 2219/0877* (2013.01); *B01J 2219/1203* (2013.01); *Y02E 60/364* (2013.01); *Y02E 60/528* (2013.01); *Y02P 20/133* (2015.11); *Y02P 20/136* (2015.11)

(58) Field of Classification Search
CPC ...... B01J 2219/0871; B01J 2219/0877; H01M 8/186; Y02P 20/136; Y02P 20/133; Y02E 60/364; Y02E 60/528
USPC ............................ 204/157.5, 157.52, 157.43
See application file for complete search history.

(56) References Cited

U.S. PATENT DOCUMENTS

| | | | |
|---|---|---|---|
| 7,605,326 B2 | 10/2009 | Anderson | |
| 7,892,407 B2 | 2/2011 | Gibson et al. | |
| 8,216,432 B2 | 7/2012 | Brooks et al. | |
| 8,974,743 B2 * | 3/2015 | Krull | B01J 19/126 219/678 |
| 2004/0013923 A1 * | 1/2004 | Molter | C25B 1/04 429/413 |
| 2005/0048334 A1 | 3/2005 | Sridhar et al. | |
| 2006/0086603 A1 | 4/2006 | Wyles | |
| 2006/0163054 A1 * | 7/2006 | Spitzl | B01D 53/32 204/157.15 |
| 2007/0017913 A1 * | 1/2007 | Martinez | B01J 19/126 219/687 |
| 2007/0079611 A1 * | 4/2007 | Doland | C25B 1/04 60/495 |
| 2008/0135403 A1 | 6/2008 | Jang et al. | |
| 2009/0071816 A1 * | 3/2009 | Wallin | B01J 19/088 204/157.43 |
| 2009/0084107 A1 | 4/2009 | Gleasman | |
| 2009/0178918 A1 | 7/2009 | Gibson et al. | |
| 2009/0196801 A1 | 8/2009 | Mills | |
| 2009/0294300 A1 | 12/2009 | Kanzius | |
| 2010/0258429 A1 * | 10/2010 | Ugolin | B01J 8/0055 204/157.43 |

FOREIGN PATENT DOCUMENTS

| | | |
|---|---|---|
| JP | 2004320823 A | 11/2004 |
| WO | 2001021300 A2 | 3/2001 |
| WO | 02/13577 A1 | 2/2002 |
| WO | 2008064002 A2 | 5/2008 |
| WO | 2010077350 A2 | 7/2010 |

* cited by examiner

GENERATING ENERGY FROM WATER TO HYDROGEN SYSTEM

CROSS-REFERENCE TO RELATED APPLICATIONS

This application is a U.S. National Phase Application under 35 USC 371 of International Application No. PCT/IL2013/050858, which has an international filing date of Oct. 23, 2013, and which claims priority and benefit from U.S. Provisional Application No. 61/717,645 filed Oct. 24, 2012, the full contents and disclosure of which are incorporated herein by reference in their entirety.

FIELD OF THE INVENTION

This invention relates to a system for dissociating water into hydrogen and oxygen with high efficiency to generate hydrogen.

BACKGROUND OF THE INVENTION

There are many sources of energy that are either significantly underused or are only used in limited markets. Examples of such energy sources are wind solar energy, and water power. Some, such as wind and solar power, are intermittent. All, at present, require connection to an electrical grid to transmit the power from the generation points to the points of use.

More energy from sunlight strikes the Earth in one hour than all the energy consumed on the earth in a year. Although the solar electricity is a 7.5 billion industry which was growing at the rate of 35-40% per annum in 2001, in that year, it produced less than 0.1% of the world's electricity. The huge gap between our present use of solar energy and its underdeveloped potential defines a grand challenge in energy research. Covering 0.16% of the land of the Earth with 10% efficient solar conversion systems would provide 20 TW of power, nearly twice the world's consumption rate of fossil energy.

Many renewable resources are intermittent, i.e., they are not available all the time. Efficient storage of energy from renewable sources allows supply to more closely match demand. For example, a storage system that can store energy captured around the clock and dispatch that energy into the higher priced mid-day market would allow solar energy to be used day or night.

The U.S. Department of Energy has said that an improved method of storage of electrical energy is one of the main challenges preventing the substantial installation of renewable energies such as wind and solar power. Storage is vital for times when the wind does not blow or the sun does not shine. During those times, stored electrical energy can get to the electrical grid as needed.

An idea of the potential of one form of renewable energy, solar power, is provided by Professor David Falman of Israel's Ben Gurion University, who says that a series of solar energy power stations in the Negev could supply all of Israel's power needs and that all of the world's electrical needs could be supplied with the solar power stations covering slightly less than 10 percent of the Sahara.

However, use of solar power, wind power, water power, or any other source of power where it is desired to produce the power a location remote from the location of use of the power, requires a means for transporting the power from one location to another. Building electrical grids over long distances can be extremely costly. Furthermore, in many cases, such as automobiles, connection to a grid during use is not acceptable.

Therefore, there is a long-felt need for a means of production of energy that does not depend on connection to an electrical grid or other fixed installation to transport the energy to the point of use thereof.

SUMMARY OF THE INVENTION

It is an object of the invention to provide a means and method for dissociating water into hydrogen and oxygen with high efficiency to generate hydrogen.

It is another object of the invention to disclose a system for generating hydrogen by dissociation of water, characterized by: (a) a hydrogen generation chamber (90) for generating hydrogen from water, said water containing electrolytes; (b) an energy source for providing energy to drive dissociation of the water; and (c) a control unit (3) for controlling the energy source and liquid and gas flow, wherein the energy source is a source of radiofrequency (RF) electromagnetic energy.

It is another object of the invention to disclose the system, wherein the RF electromagnetic energy induces dissociation of water into hydrogen and oxygen.

It is another object of the invention to disclose the system, wherein the frequency of the RF electromagnetic energy is in the range of approximately 10 MHz to approximately 30 MHz.

It is another object of the invention to disclose the system, wherein the hydrogen generation chamber comprises (a) a substantially fluid-tight inner chamber characterized by a substantially fluid-tight wall; and (b) a substantially fluid-tight outer chamber at least partially surrounding the inner chamber, the outer chamber adapted to contain a liquid comprising water; the outer chamber comprising (i) a fluid inlet adapted to allow ingress of the liquid comprising water and (ii) a fluid outlet adapted to allow egress of gas.

It is another object of the invention to disclose the system, wherein the source of RF energy comprises an antenna located within the inner chamber; the wall of the inner chamber adapted to allow passage therethrough of RF energy, the inner chamber adapted to prevent contact between the antenna and the water in the outer chamber.

It is another object of the invention to disclose the system, wherein the control unit is adapted to (i) transmit a predetermined amount of energy to the source of RF energy, (ii) control the frequency and power of the RF energy, (iii) control the flow rate of the liquid comprising water into the outer chamber, and the control flow rate of the gas exiting the outer chamber.

It is another object of the invention to disclose the system, wherein the electrolytes are provided by a salt, the salt selected from a group consisting of sodium chloride, potassium chloride, and any combination thereof.

It is another object of the invention to disclose the system, additionally comprising a power generating system selected from a group consisting of: a solar panel, a hydropower generation system, a geothermal power generation system, a wind power generation system, a fossil fuel powered energy generation system, a biofuel powered energy generation system, a wood products-based fuel powered energy generation system, a biogas powered energy generation system, and any combination thereof.

It is another object of the invention to disclose the system, additionally comprising at least one of a group consisting of: a hydrogen storage system and an electric generator powerable by said hydrogen gas.

It is another object of the invention to disclose the system, additionally comprising at least one of a group comprising: a liquid storage device in fluid communication with the outer chamber and an electrolyte storage device in fluid communication with the outer chamber.

It is another object of the invention to disclose the system, additionally comprising a heat exchanger adapted to remove heat from gas exiting the outer chamber and add heat to the liquid comprising water before the liquid enters the outer chamber.

It is another object of the invention to disclose the system, further comprising a filter downstream of said fluid outlet adapted to separate said hydrogen gas from said oxygen gas.

It is another object of the invention to disclose the system, additionally comprising at least one check valve adapted to prevent backflow of gas into the outer chamber.

It is another object of the invention to disclose the system, further comprising a mechanism for converting water into mist, the mechanism comprising at least one of a group consisting of holes in the walls of the outer chamber, nozzles in the outer chamber and any combination thereof.

It is another object of the invention to disclose the system, further comprising a mechanism to support and stabilize water droplets in the mist.

It is another object of the invention to disclose a method for generating hydrogen by dissociation of water, comprising steps of (a) providing a system for generating hydrogen by dissociation of water, characterized by: (i) a hydrogen generation chamber for generating hydrogen from water, the water containing electrolytes; (ii) an energy source for providing energy to drive dissociation of the water, wherein the energy source is a source of radiofrequency (RF) electromagnetic energy; and (iii) a control unit for controlling the energy source and liquid and gas flow; (b) at least partly filling the hydrogen generation chamber with water, under control of said control unit; and (c) generating energy and transmitting the energy to the water, thereby dissociating the water into hydrogen and oxygen.

It is another object of the invention to disclose the method, additionally comprising steps of providing a hydrogen generation chamber comprising a substantially fluid-tight inner chamber characterized by a substantially fluid-tight wall; and a substantially fluid-tight outer chamber at least partially surrounding the inner chamber, the outer chamber adapted to contain a liquid comprising water; the outer chamber comprising a fluid inlet adapted to allow ingress of a liquid comprising water and a fluid outlet adapted to allow egress of gas.

It is another object of the invention to disclose the system, additionally comprising steps of converting the water into mist by means of at least one of a group consisting of holes in the walls of the outer chamber, nozzles in the outer chamber and any combination thereof.

It is another object of the invention to disclose the system, additionally comprising steps selected from a group consisting of storing said hydrogen in a hydrogen storage system, powering an electric generator by hydrogen gas and any combination thereof.

It is another object of the invention to disclose the system, additionally comprising steps of providing a power generating system selected from a group consisting of: a solar panel, a hydropower generation system, a geothermal power generation system, a wind power generation system, a fossil fuel powered energy generation system, a biofuel powered energy generation system, a wood products-based fuel powered energy generation system, a biogas powered energy generation system, and any combination thereof.

BRIEF DESCRIPTION OF THE DRAWINGS

In order that the invention may be more clearly understood, it will now be disclosed in greater detail with reference to the accompanying drawing, wherein.

DETAILED DISCLOSURE OF THE INVENTION

Figure 1:
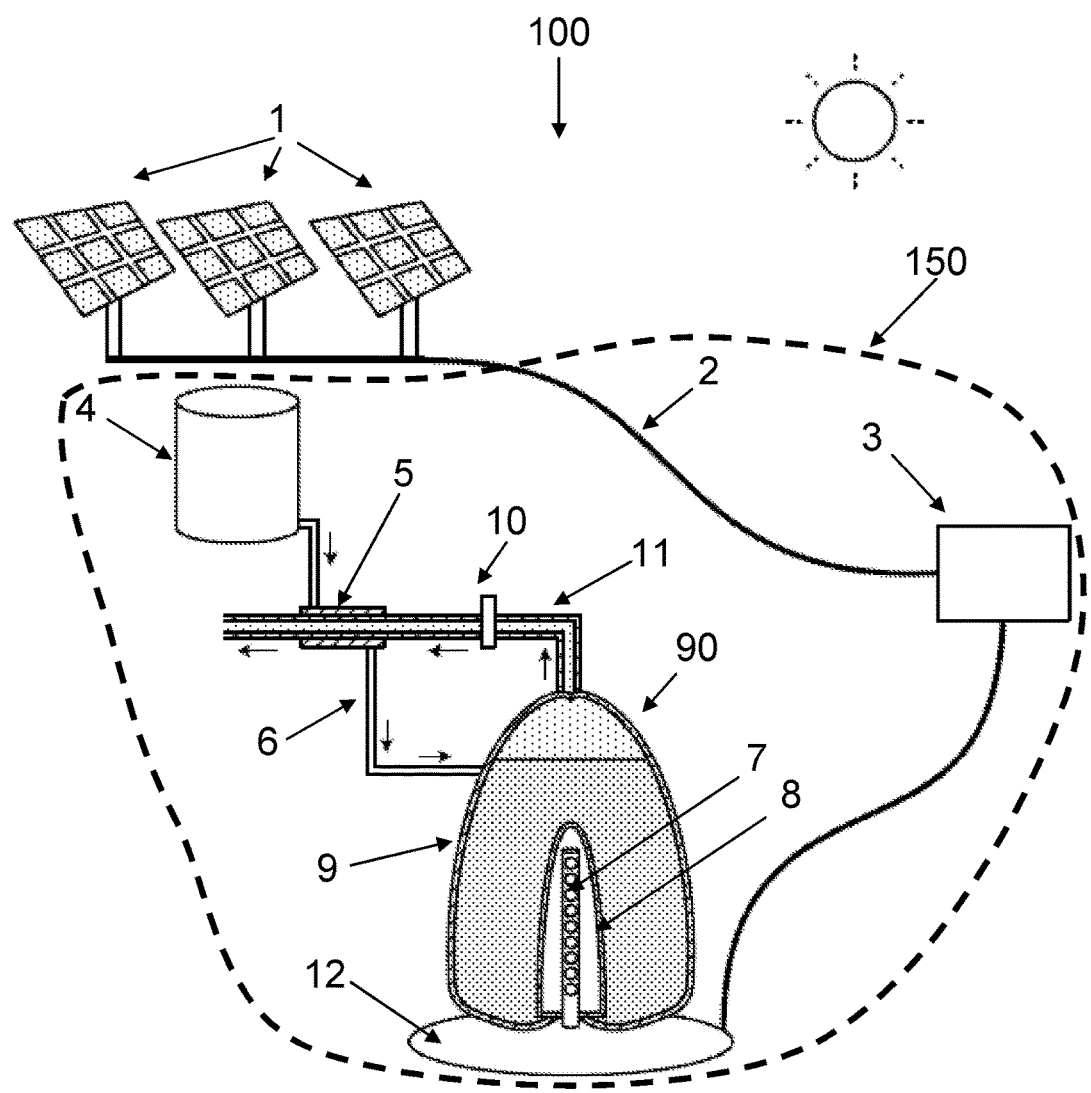
FIG. 1 schematically illustrates a partially cutaway perspective view to show the structure of an embodiment of the system.

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for dissociating water into hydrogen and oxygen with high efficiency to generate hydrogen.

The terms 'dissociate' and 'dissociation' hereinafter refer to the dissolution of water into hydrogen and oxygen gas. The dissociation reaction is commonly written $2H_2O \rightarrow 2H_2+O_2$.

In the figures, identical numbers indicate similar functions.

This invention is directed to the provision of a method of capturing power, such as but not limited to solar power or any alternative power and storing it for later use, for non-limiting example, for times when the sun is not shining or the wind is not blowing, for use in mobile applications, for use at locations remote from the source of the captureable power, or for use at times of high demand.

The invention relates to a complete system for generating power at the point of need through the following process:
1. The system takes another system's power,
2. Converts water into hydrogen and oxygen,
3. Stores the hydrogen in a tank or other storage system, and
4. Upon demand, converts the hydrogen back into water to generate electricity.

This system's key is the ability to store energy such as, but not limited to, solar or wind energy for use at a time when the energy provision means is not available, such as the sun not shining or the wind not blowing.

The conversion of water is done in a unique hydrogen generation unit and utilizes radiofrequency (RF) electromagnetic radiation to convert the water to hydrogen and oxygen gas. The system includes means for introducing water into the top of the first portion of the tank. The water intake into the hydrogen generating stage is utilized to cool the hydrogen being generated. The hydrogen output is treated so moisture and heat are removed from the hydrogen and the oxygen separated from the hydrogen. The system includes a control computer, monitoring devices and numerous one-way valves so that data on the operation of the system can be captured and the operating conditions of the system modified so that the system is operating at optimal capacity substantially all of the time.

It is to be noted that there is no electric current in the outer chamber, nor are there any electrodes in the outer chamber so that the dissociation of the water is not induced by electrolysis.

At present, there are two theories for the mechanisms for induction of dissociation in the water. The first is that the RF electromagnetic energy heats the water to about 800 C, thereby causing it to dissociate. The second is that the RF electromagnetic energy excites one or more resonant frequencies of the covalent H—O bonds in the water, thereby causing dissociation of the water. It is not known which of these postulated mechanisms is the operative one herein, whether both are operative, or whether an entirely different mechanism is operative.

The core of the invention is a hydrogen generation system. This can form part of a complete energy system, or can be used to generate hydrogen for use elsewhere.

For example, the combination of this system with a conventional solar panel system and a conventional electric generator can form a complete alternative energy system. The solar panel system provides a source of energy, the present system provides the energy capture means, a conventional hydrogen storage system comprises the energy storage means, while a hydrogen-powered electric generator provides energy at the point of use. The system is not limited to solar energy; any power generating system can be used to power the system. Other examples of power sources include, but are not limited to, wind and water power.

The hydrogen generated by the present system can be employed, for non-limiting example, as a fuel for powering automobiles, ships, airplanes and rockets, or for generating electricity for supply to a grid. Since the burning of hydrogen produces only water, the system enables reduction of air pollution.

Example 1

FIG. 1 schematically illustrates, in an out-of-scale manner, an exemplary embodiment (100) of an energy generation and storage system which includes the present hydrogen generation system. In this example, generation of energy is by solar (110) energy falling on conventional solar panels (1); any conventional electricity generating means can be used instead of the solar panels (1). The electricity generated by the panels (1) or other generating means is transmitted via a conventional electric power line (2) to the central command and control system (3) of the hydrogen generation system (dashed line, 150). The solar panels are exemplary; any conventional means of generating electricity that provides between 200 to 300 watts of power can be used in place of the solar panels (1).

The central command and control system (3) controls: generation of electromagnetic radiation in a device comprising an antenna (7), the rate of hydrogen generation, temperatures throughout the hydrogen generation system, and the efficiency of operations taking place in the hydrogen generation system.

In the hydrogen generation system (150), water is stored in a storage device (4). The command and control center (3) controls flow of the water from the storage device (4) to the hydrogen generation chamber (90). The water can be fresh water or water containing a desired balance of electrolytes. Preferably, salt water of a predetermined molarity is used to establish the electrolyte balance.

In some embodiments, fresh water is stored in the storage device (4), with the electrolytes being added either before or during entry into the hydrogen generation chamber (90).

In other embodiments, water containing a desired balance of electrolytes, such as salt water of a predetermined molarity, is stored in the storage device (4).

In yet other embodiments, fresh water is stored in the storage device (4) and is added to the hydrogen generation chamber (90), with the electrolytes being added directly to the hydrogen generation chamber (90).

In embodiments of the device wherein the water stored in the storage device (4) is fresh water, addition of electrolytes is under the control of the command and control center (3).

Water exiting the storage device (4) passes through a heat exchanger (5) where it is heated by hot gasses exiting the hydrogen generation chamber (90), thereby heating the incoming water before it enters the hydrogen generation chamber (90) and cooling the hydrogen before it enters the hydrogen storage device (not shown). The heated water then passes though an inline fluid communication system (6) to the hydrogen generation chamber (90).

The hydrogen generation chamber (90) comprises two separate chambers, an inner dry chamber, the transmitter chamber (8), which is at least partly surrounded by an outer wet chamber (9). The transmitter chamber (8) contains an antenna (7), which transmits RF electromagnetic energy into the hydrogen generation chamber (90). The antenna (7) typically comprises a means of generating RF electromagnetic energy. The outer wet chamber (9) is at least partly filled with a mixture comprising $H_2O$, electrolytes and hydrogen. The transmitter chamber (8) enables continuous generation of hydrogen in the outer wet chamber (9). This unique setup incorporates an antenna, which remains separate from the water and which transmits RF electromagnetic energy through the walls of the inner dry chamber (8) into a second vessel, the outer wet chamber (9), at least partly filled with, preferably, salt water. This set up provides several unique advantages; the first chamber protects the antenna from the possibly corrosive environment of the outer wet chamber (9), which allows uninterrupted hydrogen generation. In the outer wet chamber (9), the water absorbs the transmitted electromagnetic energy so none reaches outside the outer wet chamber (9), thereby ensuring efficient conversion of the transmitted energy into hydrogen gas.

A mixture of hydrogen gas and oxygen gas flows out of the outer wet chamber (9) through an in-line piping system (11) comprising at least one heat exchanger (5) to the hydrogen storage system (not shown). The oxygen is separated from the hydrogen before storage in the hydrogen storage system.

The hydrogen generation system (150) also comprises sensors and other monitoring devices in communication with the command and control system (3). Parameters which can be monitored include, but are not limited to temperature, pressure, power generated by the power generation means (1), rate of hydrogen generation, liquid level in the wet chamber (9), liquid level in the storage device (4), flow rate of water into the outer wet chamber (9), molarity of the water in the outer wet chamber (9), flow rate of gas, and fraction of hydrogen in the gas at various positions in the in-line piping system (11). Temperatures that can be measured include, but are not limited to, at the wall of the outer wet chamber (9), at the wall of the inner transmission chamber (8), in the water, in the in-line piping system (11), and any combination thereof.

The command and control system (3) comprises a processor adapted to process the measured parameters fed back from the sensors and monitors, and to use these data to alter control parameters such as, but not limited to, flow rate of water into the outer wet chamber (9), molarity of the water in the outer wet chamber (9), flow rate of gas in the in-line piping system (11), and transmitted radio wave intensity so as to maintain the system in optimum or near-optimum operating conditions.

Control of flow control parameters such as flow rate of water into the outer wet chamber (9), flow rate of electrolyte into the outer wet chamber (9), and flow rate of gas in the in-line piping system (11) is typically via valves, although any conventional flow control mechanism can be used.

The power to dissociate the water is provided by RF electromagnetic radiation generated by an antenna (7) inside an inner transmission chamber (8) and this transmission chamber (8) being at least partly surrounded by a second chamber (9) at least partly full of water comprising electrolytes, with the water being dissociated into hydrogen and oxygen by the electromagnetic radiation. A supply of water is maintained in a separate storage device (4). The water in the storage device (4) can be either fresh or contain a desired balance of electrolytes, preferably salt water of a predetermined molarity. Use of a separate storage device allows easy maintenance of the system, as the storage device (4) can be refilled with salt water without interfering with the operation of the hydrogen generator. Embodiments with fresh water in the storage device can comprise at least one additional storage device (not shown) containing at least one electrolytes. In embodiments with separate electrolyte storage, the electrolyte storage devices can be refilled without interrupting the operation of the hydrogen generator.

Significant amounts of water vapor can be present in the outer chamber (9) due to evaporation of water therein, especially during periods when the system is not in use, e.g. it is neither charging nor discharging and, typically, has reached equilibrium. Therefore, the gas in the chamber will be a mixture of hydrogen, oxygen and water vapor. In systems lacking valves in the in-line gas piping system (11), this water vapor will diffuse through the entire system, leading to the presence of significant amounts of water vapor, and possibly liquid water, in the hydrogen storage system or the electricity generation system, if present. This can significantly degrade the efficiency of the system and can, under some circumstances, lead to corrosion in the in-line gas piping system (11), the hydrogen storage system or the electricity generation system, if present. Therefore, in preferred embodiments, the inline gas piping system (11) incorporates valves to limit egress of water vapor from the outer chamber (9) during periods of non-use. An exemplary valve (10) is shown in the in-line gas piping system (11), downstream of the outer chamber (9) and upstream of the heat exchanger (5). Typically these valves are conventional one-way check valves.

One way check valves are generally disposed in a fluid communication means, such as pipes, and operate to permit fluid communication across the check valve only when the pressure on the fluid sending side is sufficiently greater than the pressure on the fluid receiving side. In the event the pressure is reversed, the check valve automatically closes, preventing backflow of the fluid.

During periods of use, RF electromagnetic energy is present in the outer chamber (9), causing dissociation of water and generation of hydrogen (and oxygen) gas. Therefore, the pressure in the system increases, causing the one-way check valves (10) to open allowing the hydrogen to flow to the hydrogen storage system, or to an energy generation system.

During periods of non-use, pressure in the outer chamber (9) drops, eventually dropping below the pressure in the hydrogen storage system. This causes the check valve (10) to close, preventing backflow of hydrogen from the hydrogen storage system to the hydrogen generation system (90).

In preferred embodiments of the system, dual one-way check valves are used. The dual one-way check valves comprise two one way conical check valves, which permit hydrogen gas to flow in only one direction, e.g. from the hydrogen generation chamber (9) to either the hydrogen storage system or the energy conversion device.

This embodiment further comprises a support stand (12) which serves two purposes, (1) it supports the chambers above it and (2) it has incorporated in it a measuring device (not shown) in communication with the command and control device (3). In this embodiment, the measuring device determines the amount of water inside the outer chamber (9), thereby enabling the command and control device (3) to increase or decrease the amount of liquid entering the outer chamber (9) so as to keep the total amount of liquid in the outer chamber (9) within predetermined limits.

Figure 2:
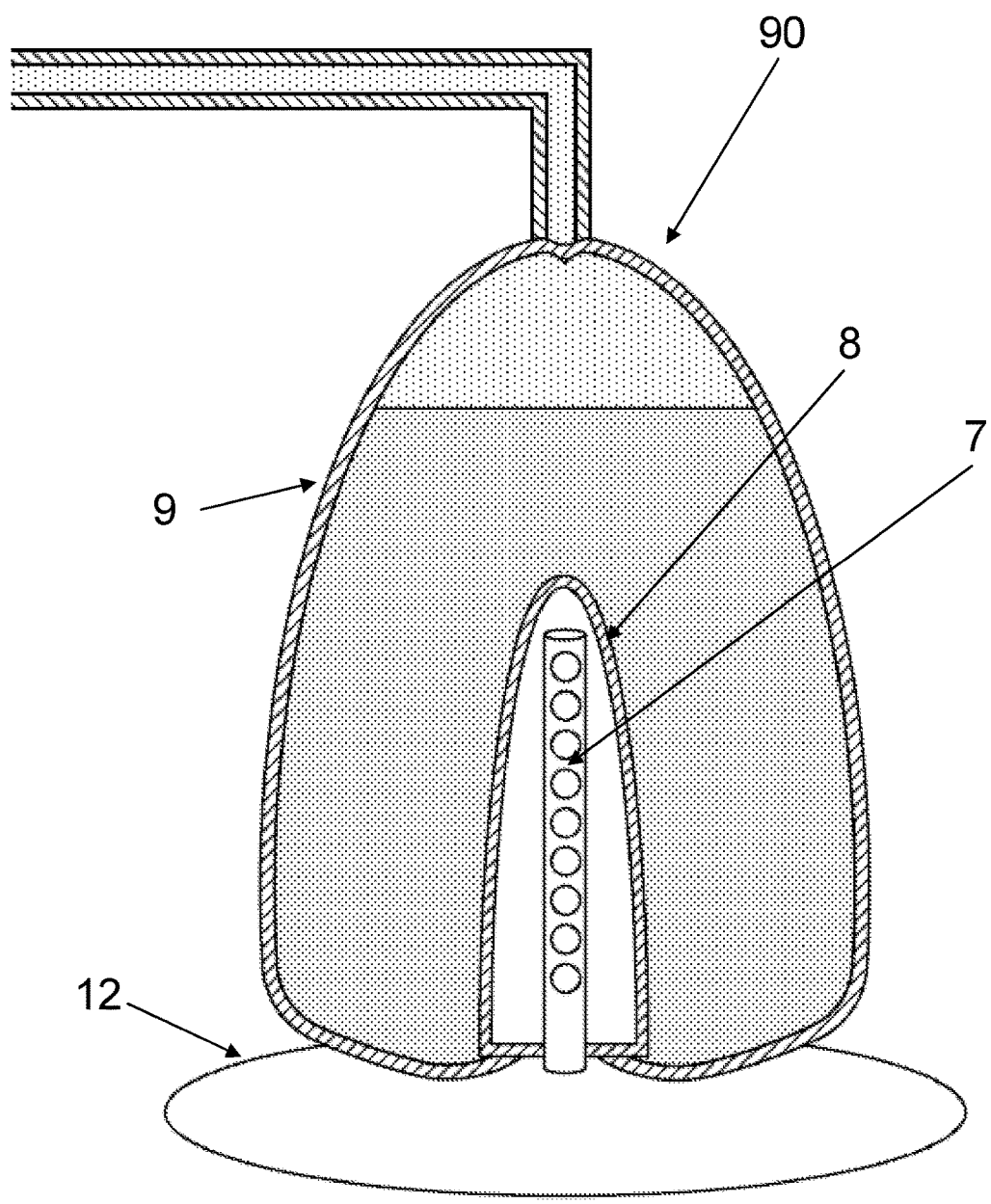
FIG. 2 schematically illustrates an enlarged partially sectional side view of another embodiment of the system.

FIG. 2 schematically illustrates, in an out of scale manner, an enlarged partially sectional side view of an embodiment of the hydrogen generation chamber. The hydrogen generation chamber (90) comprises an inner dry chamber (8) and an outer wet chamber (9) at least partially surrounding the inner dry chamber (8). A transmitter of RF energy (7) is located within the inner dry chamber (8). The walls of the inner chamber (8) are made of a material which allows the passage therethrough of RF electromagnetic energy, typically, but not limited to, glass or non-shielding plastic. However, the walls of the inner chamber (8) are impermeable to fluids, especially water and hydrogen or oxygen gas.

In the embodiment shown in FIG. 2, the transmitter of RF energy (7) comprises a antenna or transmission tower.

The walls of the outer chamber (9) comprise several layers. These layers can comprise: (a) Layers for absorbing and reflecting back the heat generated by the dissociation of water, thus increasing the efficiency of the process. (b) Layers reflecting back the RF electromagnetic energy thus increasing efficiency of the process, and (c) Layers absorbing the RF electromagnetic energy so the RF electromagnetic energy are limited to the container.

The transmitter chamber (8) enables continuous generation of hydrogen in the outer wet chamber (9). This unique setup incorporates both the use of RF electromagnetic energy being generated or transmitted by an antenna (7) and transmitted through the walls of the inner dry chamber (8). The inner dry chamber (8) protects the antenna (7) from the water in the outer wet chamber (9). The antenna (7) and dry chamber (8) are surrounded by a second vessel at least partly filled with, preferably, salt water. This set up provides several unique advantages, the first chamber (8) allows for an uninterrupted hydrogen generation. In the second chamber (9) the water effectively shields the transmitted RF electromagnetic energy and more rapidly absorbs and converts the transmitted energy into hydrogen gas.

A mixture of hydrogen gas and oxygen gas flows out of the outer wet chamber (9) through an in-line piping system (11) comprising at least one heat exchanger (5) to the hydrogen storage system (not shown). The oxygen is separated from the hydrogen before storage in the hydrogen storage system.

This embodiment further comprises a support stand (12) which serves two purposes, (1) it supports the chambers above it and (2) it has incorporated in it a measuring device (not shown) in communication with the command and control device (3). In this embodiment, the measuring device determines the amount of water inside the outer chamber (9), thereby enabling the command and control device (3) to increase or decrease the amount of liquid entering the outer chamber (9) so as to keep the total amount of liquid in the outer chamber (9) within predetermined limits.

Figure 3:
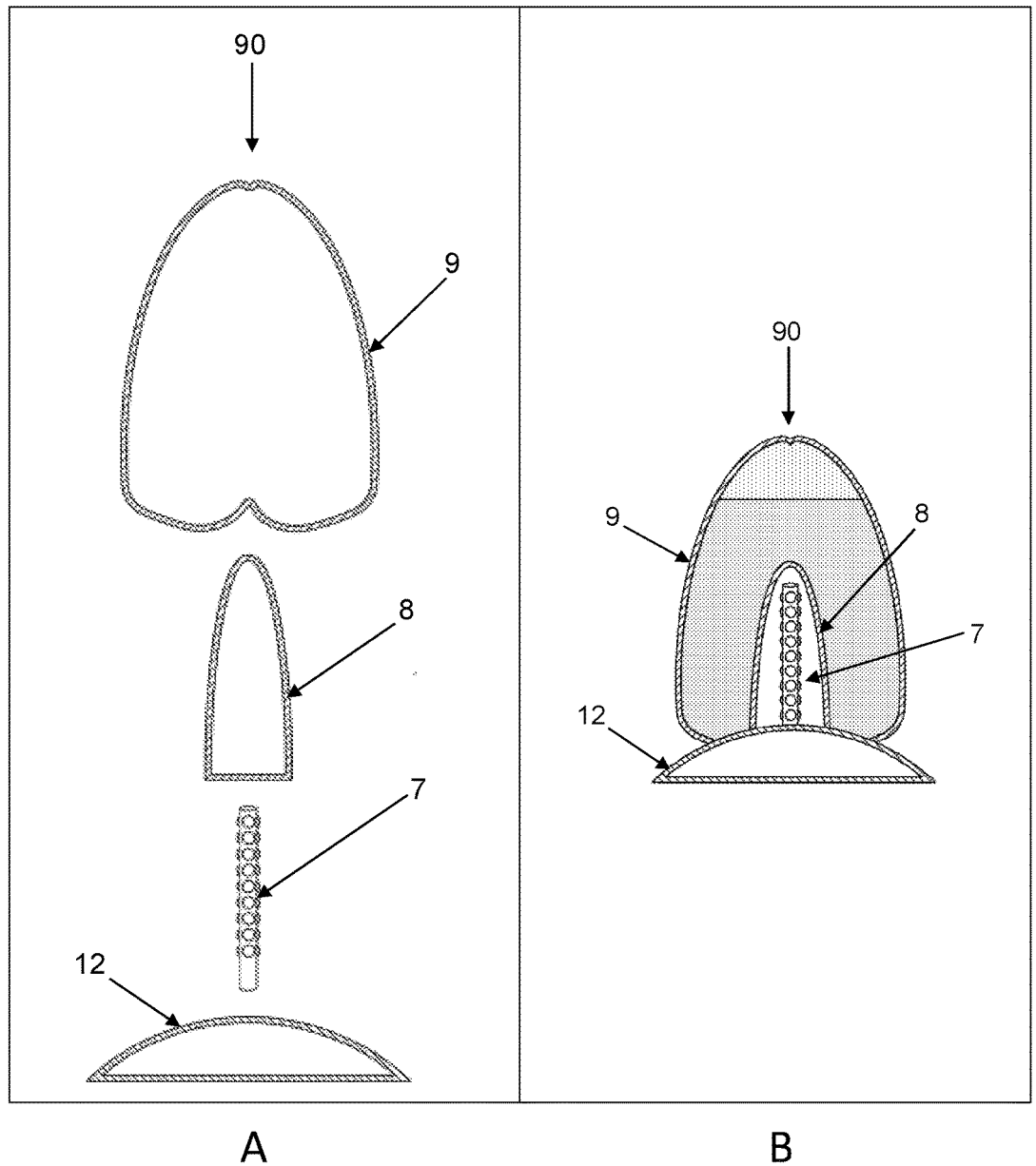
FIG. 3 schematically illustrates an enlarged partially sectional side view of the embodiment of FIG. 2, showing the construction of chambers 8 and 9 in more detail.

FIG. 3 schematically illustrates, in an out of scale manner an enlarged partially sectional side view of the foregoing multi-tier system. FIG. 3A shows the system with the parts separated, whereas FIG. 6B shows them assembled.

The hydrogen generation chamber (90) comprises two separate chambers, an inner dry chamber, the transmitter chamber (8), which is at least partly surrounded by an outer wet chamber (9). The transmitter chamber (8) contains a device, the transmitter device or antenna (7), which transmits RF energy into the hydrogen generation chamber (90). The transmitter device (7) typically comprises a means of generating RF electromagnetic energy. The outer wet chamber (9) is at least partly filled with a mixture comprising $H_2O$, electrolytes and hydrogen. The transmitter chamber (8) enables continuous generation of hydrogen in the outer wet chamber (9). The entire system is stably retained in its upright position by the support (12).

During assembly, the transmitter device (7) is inserted inside the dry inner chamber (8). The dry inner chamber (8) is positioned within the outer wet chamber, the hydrogen generation chamber (9).

Figure 4:
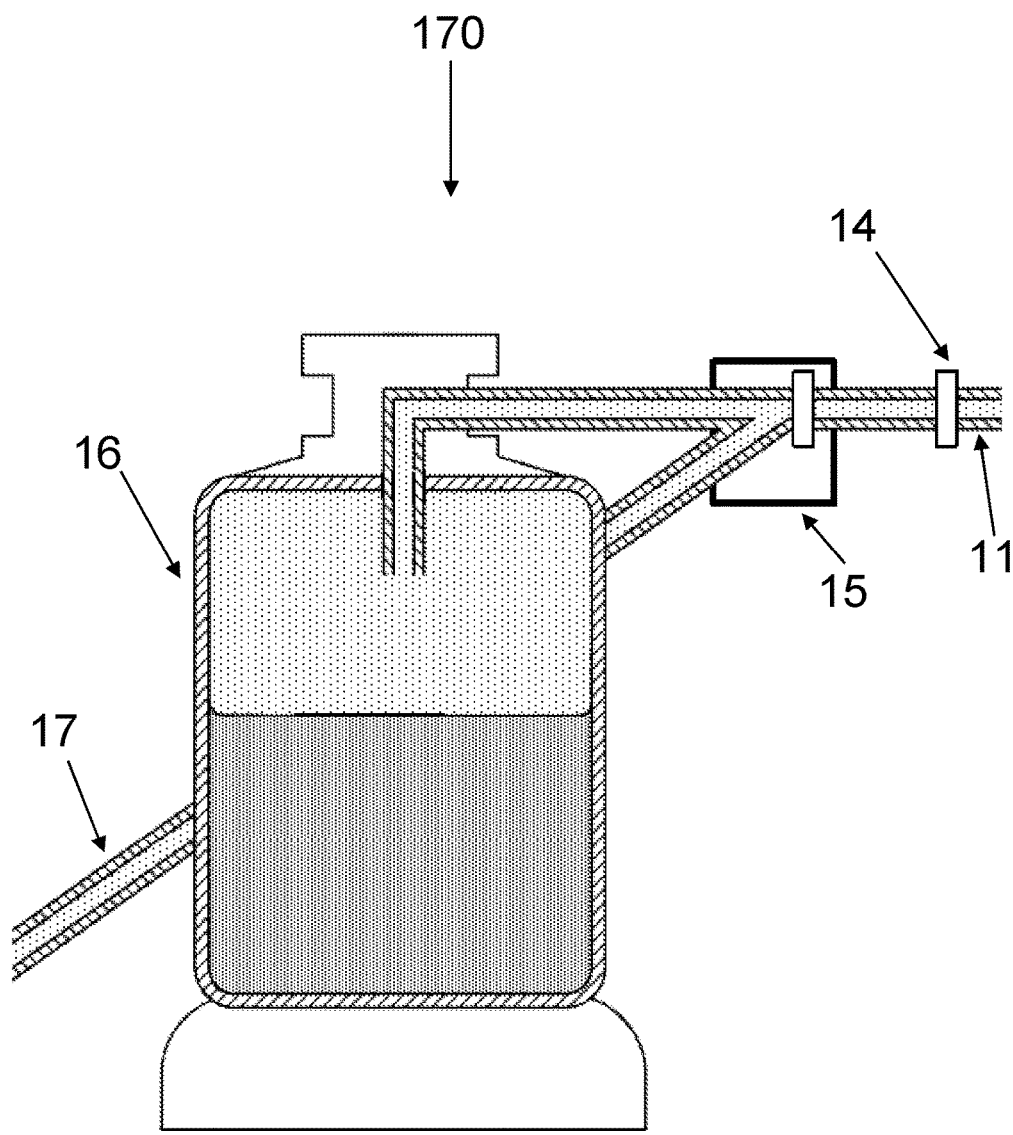
FIG. 4 schematically illustrates a partially cutaway perspective view showing the structure of stage two of the three stages in a third embodiment of the system.

FIG. 4 schematically illustrates, in an out of scale manner a partially cutaway perspective view showing an exemplary hydrogen storage system (170).

In the exemplary hydrogen storage system (170), hydrogen from the hydrogen generation chamber (90, not shown), passes through the inline gas piping system (11) either to the hydrogen storage system (170) or to an energy generation system (not shown) such as a hydrogen-powered generator or other means of generating electrical energy from the hydrogen.

FIG. 4 illustrates two of the valves in preferred embodiments of the system. The check valve (14), as described above, prevents hydrogen from returning to the hydrogen generation chamber (90, not shown). The Y control valve (15) has three positions: (1) Gas passes from the hydrogen generation chamber (90, not shown) to the hydrogen storage device (16). (2) Gas passes from the hydrogen generation chamber (90, not shown), via the in-line gas piping (17) to the energy generation system (not shown). (3) Gas passes from the hydrogen storage device (16) via the in-line gas piping (17) to the energy generation system (not shown). The positions of the Y valve are under the control of the command and control device (3, not shown).

In some embodiments, the check valve (14) in under the control of the command and control device (3, not shown). In preferred embodiments, the check valve (14) operates automatically, as described above.

In all of the above embodiments, the water is heated before being dissociated by the RF energy, since the hot water is more efficiently dissociated than cold water.

Figure 5:
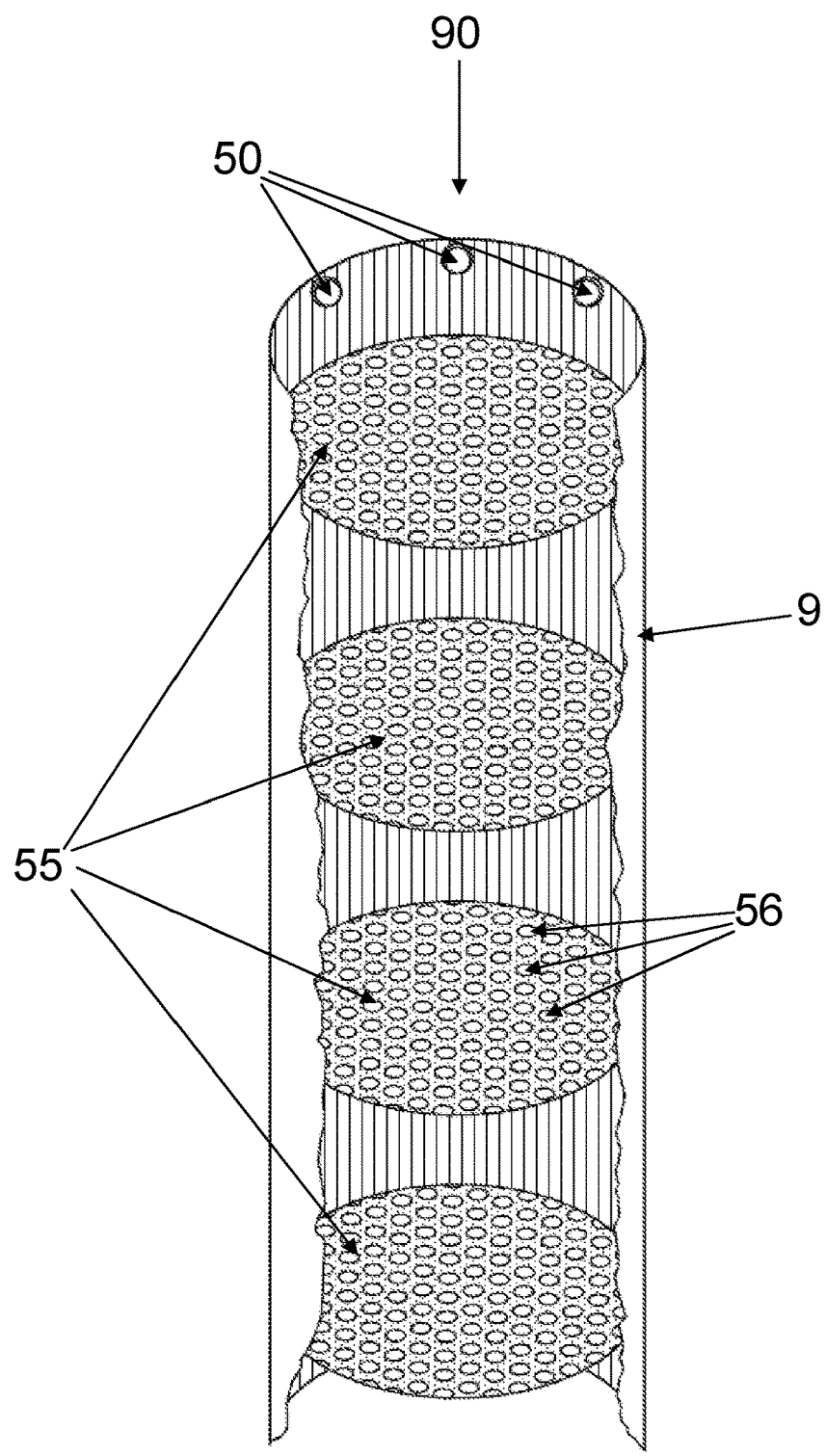
FIG. 5 schematically illustrates a fourth embodiment of the present invention.

FIG. 5 schematically illustrates, in an out of scale manner, another embodiment of the present invention. In this embodiment, the water plus electrolyte is converted to a mist before being heated, since the small droplets in a mist have a much larger surface area than a single body of water. Since the droplets have a large surface area, they heat more readily than the single body of water. In addition, droplets are more efficiently irradiated than larger bodies of water. If the water in the chamber formed a single body, most of the radiation would be absorbed in the parts of the body of water closer to the source of radiation, causing differential heating of the water and differential generation of hydrogen. If the water is in the form of a mist of small droplets, irradiation and heating will be much more uniform, which will improve the efficiency of the device.

In the embodiment disclosed in FIG. 5, the water plus electrolyte enters through the top of the hydrogen generation chamber (90), passes through nozzles 50 and is sprayed as a mist into the outer chamber (9). The outer chamber (9) is lined with layers of webbing (55) to catch the mist and suspend it as small droplets on the webbing. The webbing has holes (56) so that the mist can reach all parts of the outer chamber (9). The webbing (55) immobilizes and stabilizes the droplets, so that the mist does not condense back into water before it has been heated and dissociated, thereby increasing the efficiency of the system compared to the embodiments shown in FIGS. 1 to 3.

FIG. 6A-C schematically illustrates, in an out of scale manner, a preferred embodiment of the hydrogen generation chamber (90). In this embodiment, the hydrogen generation chamber (90) comprises a flexible outer chamber (18) and a flexible inner chamber (8) instead of the rigid chambers disclosed in the embodiments of FIGS. 1-5.

FIG. 6A schematically illustrates, in an out of scale manner, a partly cutaway view of the preferred embodiment of the hydrogen generation chamber (90). The inner (8) and outer (18) chambers have substantially the same cross-sectional shape; in preferred variants of this embodiment, the cross-sectional shape is circular. In other variants, the cross-sectional shape is oval or elliptical.

The walls of the inner chamber (8) are substantially transparent to RF electromagnetic energy, and are substantially fluid-tight.

The walls of the outer chamber (18) reflect substantially all of the RF electromagnetic energy falling on them, so that substantially no RF electromagnetic energy escapes from the hydrogen generation chamber (90). The walls of the outer chamber (18) are substantially fluid-tight.

There is at least one port for egress of gas, which is not shown in FIG. 6A-C.

The antenna (7) is held inside the dry container in at least one holder (51) substantially transparent to RF electromagnetic energy, so that substantially all of the radiating surface of the antenna (7) is an equal distance from the side walls of the inner chamber (8). The inner chamber (8) is held in at least one porous holder (52) so that the distance between the outer wall of the inner chamber (8) and the inner surface of the wall of the outer chamber (18) is everywhere substantially the same.

In some embodiments, the porous holder (52) supports and stabilizes the water droplets in the mist.

In this embodiment, the water comprising electrolyte enters the outer chamber (18) and is converted to a mist by nozzles (50). The nozzles (50) are located close to the perimeter of the outer chamber (18), so that there is at least one mist entry region extending along substantially all of the length of the outer chamber (18). The mist production mechanism can comprise a single long nozzle or a plurality of shorter nozzles.

Figure 6:
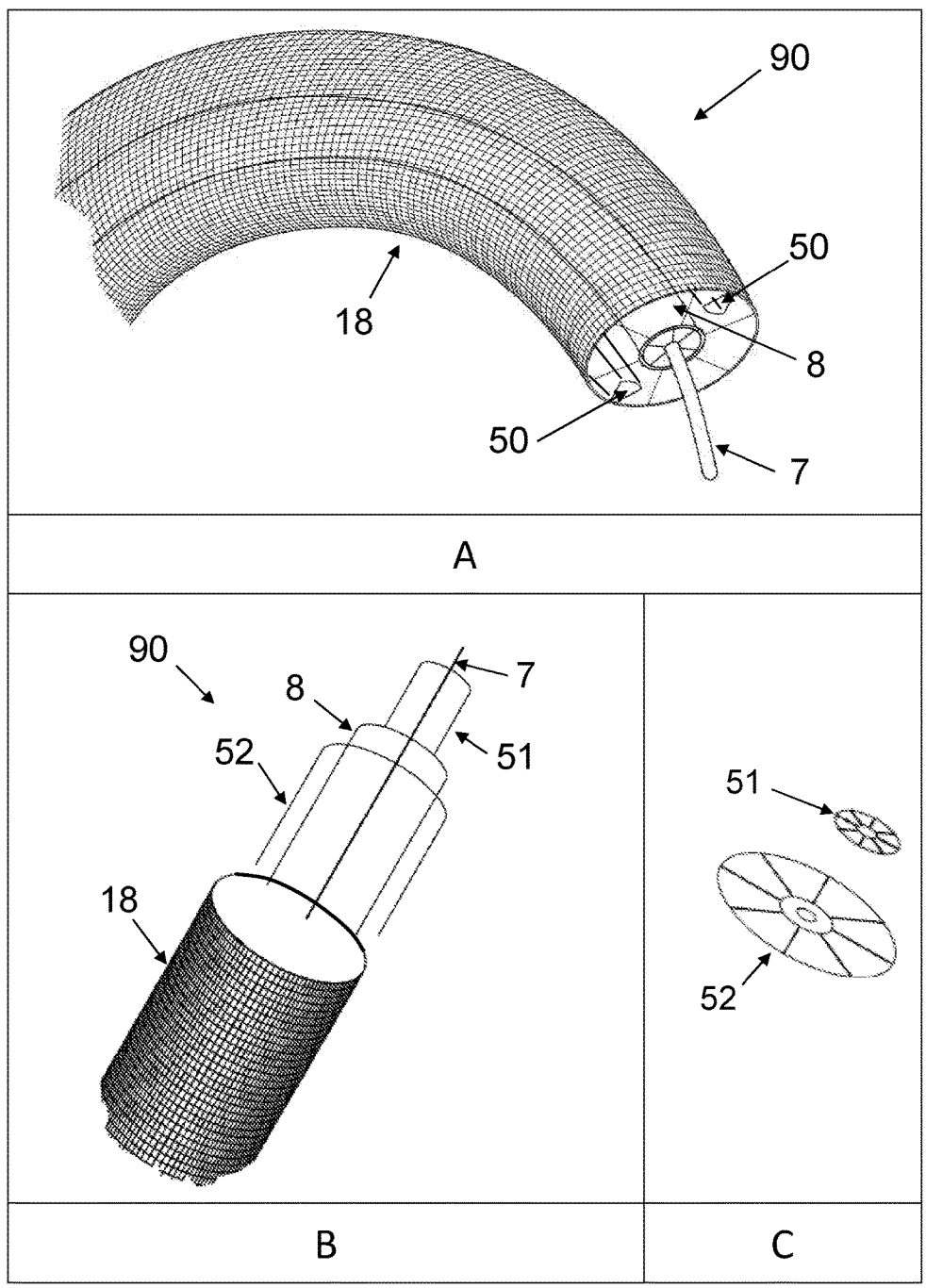
FIG. 6 schematically illustrates a preferred embodiment of the present invention.

In the preferred embodiment shown in FIG. 6, there are two mist entry regions, spaced 180° apart on the perimeter of the outer chamber (18). The number of mist entry regions can be between 1 and 6.

In this embodiment, the water comprising electrolyte is converted to a mist before being heated, since the small droplets in a mist have a much larger surface area than a single body of water. Since the droplets have a large surface area, they heat more readily than the single body of water. In addition, droplets are more efficiently irradiated than larger bodies of water. If the water in the chamber formed a single body, most of the radiation would be absorbed in the parts of the body of water closer to the source of radiation, causing differential heating of the water and differential generation of hydrogen. If the water is in the form of a mist of small droplets, irradiation and heating will be much more uniform, which will improve the efficiency of the device The mist is heated and dissociated by the RF electromagnetic energy radiated by the antenna (7). The hydrogen gas exits the system via exit ports (not shown) and passes from thence to a hydrogen storage device or power generator, as described hereinabove.

The walls of the outer chamber (18) comprise several layers. These layers can comprise (a) Layers for absorbing and reflecting back the heat generated by the dissociation of water, thus increasing the efficiency of the process. (b) Layers reflecting back the RF electromagnetic energy thus increasing efficiency of the process, and (c) Layers absorbing the RF electromagnetic energy so the RF electromagnetic energy are limited to the container.

FIG. 6B schematically illustrates, in an out of scale manner. a partly cutaway view of the hydrogen generation chamber (90) from the outside, showing the antenna (7), the inner chamber (8) and the outer chamber (18). Inside the inner chamber is a support (51) substantially transparent to RF electromagnetic energy to hold the antenna (7) at a substantially constant distance from the walls of the inner chamber (8). Between the walls of the inner chamber (8) and the walls of the outer chamber (18) is a porous support (52) so that the distance between the walls is substantially uniform.

FIG. 6C schematically illustrates, in an out of scale manner, an end view of the RF transparent inner holder (51) and the porous outer holder (52).

Advantages of the preferred embodiment of FIG. 6A-C include:
(a) It is long and narrow, enabling use of a longer antenna (7) and providing reduced distances between the antenna (7) and the mist. This means that an increased fraction of the water is close to the antenna compared to the other embodiments of the invention, so that less power is needed to heat and dissociate substantially all of the water, thereby increasing the efficiency of the system.
(b) It is flexible, so that it can be arranged linearly or bent to form an arc, an S-shape or any other desired shape. Therefore, it can be shaped to fit efficiently within the power generation system. For non-limiting example, if the power supply is provided by solar panels, a linear shape could take advantage of waste heat not absorbed by the solar panels. In another non-limiting example, in an outdoor installation, a device bent into a circle would cool more slowly than a straight device, since the curved device has less exposed surface area than the straight device.

In the system as disclosed hereinabove, the frequency of the RF electromagnetic energy is in a range between about 1 MHz and about 30 MHz.

The combination of this system with another energy conversion system such as an electric generator allows the stored energy to be converted to electrical energy.

The goal of the present invention is to convert is to generate and store hydrogen gas, and to enable the conversion of the hydrogen gas back into electricity by the most efficient means possible.

In addition to the advantages of the invention set forth above, the effect of the invention is:
1. It is possible to make electricity driven by hydrogen only, i.e. an electric generator driven by water.
2. In accordance with the invention it is possible to drive a motor bicycle, vessel, jet airplane, and rocket (solar battery is used for power source and water is obtainable from space) and also to operate an electric power generator, aluminum refinement, furnace, iron manufacture, burner, etc. by using water.
3. Since energy that has a clean exhaust can be obtained, such problems as the pollution from exhaust gasses of other power sources do not occur.
4. A particular liquid such as an electrolytic liquid is not required and regular water is usable. Therefore, water obtainable from water taps can be used, with the addition of salt or other electrolytes to establish the correct salt content, and there is no need to go to a special location, such as a gas station or battery switching station, to refill the device.
5. The energy conversion ratio can be as high as 95%.
6. The source of the RF energy can heat the water and, at the same time, be cooled by the water, which increases the efficiency of the device and reduces its size.
7. Heating the water increases the efficiency of the device. The operating voltage of the device can be reduced by up to about 10% if the water temperature is increased.

This invention can effectively take houses and businesses off the grid, making them self-sufficient and potentially able to return power to the grid.

Since a complete power generation system which includes the hydrogen generation chamber of present invention generates power locally, transmission losses are minimized. Typically, grid transmission losses are about 8% so that, if the such a power generation system is approximately as efficient as conventional power generation systems supplying power via the grid, it will effectively be about 8% more efficient than the grid generation system.

In addition to the above, the invention can be used with a methanol car, a solar cell car, an electric car, a CNG car, a hydrogen car, a gas turbine car, a Sterling cycle engine, a hydro car (electric+diesel), and a car jointly using LPG, etc. Variations other than those mentioned above are contemplated and considered to be within the scope of the invention.

The present invention also relates to a method for producing hydrogen comprising the steps of:
1. Taking electricity produced from a solar panel or any alternative energy system;
2. Transmitting said electricity to a transmitting device within an inner chamber of a vessel, the inner vessel remaining dry at all times;
3. Transmitting RF electromagnetic energy from the transmitting device within the inner chamber to into an outer chamber of the vessel, where the outer vessel is at least partly filled with water;
4. Collecting hydrogen produced from the water within the outer chamber of the vessel;
5. Separating the hydrogen from the oxygen through the use of a filter;

6. Storing the hydrogen; and
7. Converting the hydrogen into electricity.

While the invention has been disclosed and described with reference to the above embodiments, it will be apparent that variations and modification may be made therein, and it is therefore intended in the following claims to cover each such variation and modification as falls within the true spirit and scope of the invention.

What is claimed is:

1. A system for capturing power for later use, the system comprising:
   an alternative power generating system for generating electricity from an intermittent energy resource;
   a hydrogen generation chamber for generating hydrogen from water containing electrolytes, said hydrogen generation chamber comprising (a) a fluid inlet in at least indirect fluid communication with a water storage device and adapted to allow ingress of a liquid comprising water, (b) a fluid outlet in at least indirect fluid communication with a hydrogen storage system and adapted to allow egress of gas, and (c) a transmitting device for converting said electricity into radiofrequency (RF) electromagnetic energy;
   a control unit for controlling said transmitting device and liquid and gas flow; and
   a heat exchanger assembly comprising:
   (a) a first fluid conveyance having respective first upstream and first downstream ends, connected at said first upstream end to said fluid outlet and at said first downstream end to said hydrogen storage system;
   (b) a second fluid conveyance having respective second upstream and second downstream ends, connected at said second upstream end to said water storage device and at said second downstream end to said fluid inlet, and
   (c) a heat exchanger apparatus disposed at an intersection of the first and second fluid conveyances, the heat exchanger apparatus being in direct fluid communication via the first fluid conveyance with both of said fluid outlet and said hydrogen storage system, and in direct fluid communication via the second fluid conveyance with both of said water storage device and said fluid inlet,
   wherein the heat exchanger apparatus is adapted to remove heat from a gas exiting the hydrogen generation chamber via the fluid outlet and conveyed from the fluid outlet to the heat exchanger by the first fluid conveyance, and to add heat to a liquid comprising water conveyed from the water storage device to the heat exchanger by the second fluid conveyance before the liquid enters the hydrogen generation chamber via the fluid inlet.

2. The system of claim 1, wherein said RF electromagnetic energy induces dissociation of said water into hydrogen and oxygen.

3. The system of claim 2, wherein the frequency of said RF electromagnetic energy is in the range of approximately 10 MHz to approximately 30 MHz.

4. The system of claim 1, wherein said hydrogen generation chamber comprises (a) a substantially fluid-tight inner chamber characterized by a substantially fluid-tight wall; and (b) a substantially fluid-tight outer chamber at least partially surrounding said inner chamber, said outer chamber adapted to contain a liquid comprising water; said outer chamber comprising (i) said fluid inlet adapted to allow ingress of liquid comprising water and (ii) said fluid outlet adapted to allow egress of gas.

5. The system of claim 4, wherein said transmitting device comprises an antenna located within said inner chamber; said wall of said inner chamber adapted to allow passage therethrough of said RF energy, said inner chamber adapted to prevent contact between said antenna and said water in said outer chamber.

6. The system of claim 4, wherein said control unit is adapted to (i) transmit a predetermined amount of energy to said source of RF energy, (ii) control said frequency and said power of said RF energy, (iii) control flow rate of said liquid comprising water into said outer chamber, and control flow rate of said gas exiting said outer chamber.

7. The system of claim 4, additionally comprising at least one of a group comprising: a liquid storage device in fluid communication with said outer chamber and an electrolyte storage device in fluid communication with said outer chamber.

8. The system of claim 4, further comprising a filter downstream of said fluid outlet adapted to separate said hydrogen gas from said oxygen gas.

9. The system of claim 4, additionally comprising at least one check valve adapted to prevent backflow of gas into said outer chamber.

10. The system of claim 4, further comprising a mechanism for converting said water into mist, said mechanism comprising at least one of a group consisting of holes in the walls of said outer chamber, nozzles in said outer chamber and any combination thereof.

11. The system of claim 10, further comprising a mechanism to support and stabilize water droplets in said mist.

12. The system of claim 1, wherein said electrolytes are provided by a salt, said salt selected from a group consisting of sodium chloride, potassium chloride, and any combination thereof.

13. The system of claim 1, wherein said alternative power generating system is selected from a group consisting of: a solar panel, a hydropower generation system, a geothermal power generation system, a wind power generation system, and any combination thereof.

14. The system of claim 1, additionally comprising at least one of a group consisting of: a hydrogen storage system and an electric generator powerable by said hydrogen.

15. A method for capturing power for later use, the method employing a system which comprises:
   a. an alternative power generating system for generating electricity from an intermittent energy resource,
   b. a hydrogen generation chamber comprising a fluid inlet in at least indirect fluid communication with a water storage device and adapted to allow ingress of a liquid comprising water, a fluid outlet at least in at least indirect fluid communication with a hydrogen storage system and adapted to allow egress of gas, and a transmitting device for converting said electricity into radiofrequency (RF) electromagnetic energy;
   c. a control unit for controlling said transmitting device and liquid and gas flow; and
   d. a heat exchanger assembly comprising:
   (i) a first fluid conveyance having respective first upstream and first downstream ends, connected at said first upstream end to said fluid outlet and at said first downstream end to said hydrogen storage system;
   (ii) a second fluid conveyance having respective second upstream and second downstream ends, connected at said second upstream end to said water storage device and at said second downstream end to said fluid inlet; and (ii) a heat exchanger apparatus disposed at an intersection of the first and second fluid conveyances, in direct fluid communication via the first fluid conveyance with both of said fluid outlet and said hydrogen storage system, and in direct fluid communication via the second fluid conveyance with both of said water storage device and said fluid inlet, the method comprising:
    at least partly filling said hydrogen generation chamber with water, under control of said control unit;
    generating electricity from said intermittent energy resource;
    converting said electricity into radiofrequency (RF) electromagnetic energy;
    transmitting said radiofrequency (RF) electromagnetic energy to said water, thereby dissociating said water into hydrogen and oxygen gases; and
    transferring heat, by using the heat exchanger, from a gas exiting the hydrogen generation chamber via the fluid outlet, to a liquid entering the hydrogen generation chamber via the fluid inlet.

16. The method of claim 15, said hydrogen generation chamber comprising (a) a substantially fluid-tight inner chamber characterized by a substantially fluid-tight wall; and (b) a substantially fluid-tight outer chamber at least partially surrounding said inner chamber, said outer chamber adapted to contain a liquid comprising water; said outer chamber comprising (i) said fluid inlet adapted to allow ingress of said liquid comprising water and (ii) said fluid outlet adapted to allow egress of gas.

17. The method of claim 16, additionally comprising steps of converting said water into mist by means of at least one of a group consisting of holes in the walls of said outer chamber, nozzles in said outer chamber and any combination thereof.

18. The method of claim 15, additionally comprising steps selected from a group consisting of storing said hydrogen in a hydrogen storage system, powering an electric generator by said hydrogen and any combination thereof.

19. The method of claim 15, the alternative power generating system for generating electricity from an intermittent energy resource being selected from a group consisting of: a solar panel, a hydropower generation system, a geothermal power generation system, a wind power generation system, and any combination thereof.

\* \* \* \* \*